(12) United States Patent
Kleyman

(10) Patent No.: US 11,974,547 B2
(45) Date of Patent: May 7, 2024

(54) PET TRAINING APPARATUS

(71) Applicant: Roman Kleyman, Hollywood, FL (US)

(72) Inventor: Roman Kleyman, Hollywood, FL (US)

( * ) Notice: Subject to any disclaimer, the term of this patent is extended or adjusted under 35 U.S.C. 154(b) by 136 days.

(21) Appl. No.: 17/681,036

(22) Filed: Feb. 25, 2022

(65) Prior Publication Data

US 2023/0189762 A1 Jun. 22, 2023

Related U.S. Application Data

(60) Provisional application No. 63/290,159, filed on Dec. 16, 2021.

(51) Int. Cl.
*A01K 27/00* (2006.01)
(52) U.S. Cl.
CPC .................................. *A01K 27/005* (2013.01)
(58) Field of Classification Search
CPC .. A01K 27/005; A01K 27/006; A01K 27/001; A01K 15/02; A01K 15/023; A01K 15/04; A01K 27/002; A01K 27/003; A01K 9/10; A01K 97/10; A41F 9/005; B25H 3/00; F41C 33/046
USPC .......................................................... 2/312
See application file for complete search history.

(56) References Cited

U.S. PATENT DOCUMENTS

| | | | |
|---|---|---|---|
| 205,515 A * | 7/1878 | Von Culin | A01K 27/001 119/862 |
| 1,347,352 A * | 7/1920 | Ricks | A01K 15/04 119/760 |
| 1,364,797 A * | 1/1921 | Otti | A01K 15/04 119/761 |
| 1,365,394 A * | 1/1921 | Gerdes | A01K 15/04 119/763 |
| 2,394,144 A | 2/1946 | Brose | |
| 2,775,804 A * | 1/1957 | Ayoub | A45F 5/02 24/3.12 |
| 6,015,073 A * | 1/2000 | Wojciak | A41F 9/002 224/660 |
| 6,101,980 A | 8/2000 | Davies-Ross | |
| 7,004,114 B2 | 2/2006 | Hippensteel | |
| 7,992,525 B1 | 8/2011 | Fisher | |
| 9,326,489 B2 | 5/2016 | Ritzdorf | |
| 10,660,312 B2 | 5/2020 | Leach et al. | |
| 2003/0150402 A1 | 8/2003 | Muller | |

* cited by examiner

*Primary Examiner* — Kristen C Hayes
(74) *Attorney, Agent, or Firm* — Laurence A. Greenberg; Werner H. Stemer; Ralph E. Locher

(57) ABSTRACT

A correction device includes a collar segment for extending in a circumferential direction around an animal's neck. A lever arm affixed to the collar segment. The lever arm has an extent transverse to the circumferential direction. The lever arm has a first end extending beyond a circumferential edge of the collar segment and is rotationally displaceable about the circumferential direction to contact a rear of the neck of the animal when the animal pulls on a leash connected to the lever arm. The lever arm has a connection position opposite the first end for attachment of the leash.

16 Claims, 6 Drawing Sheets

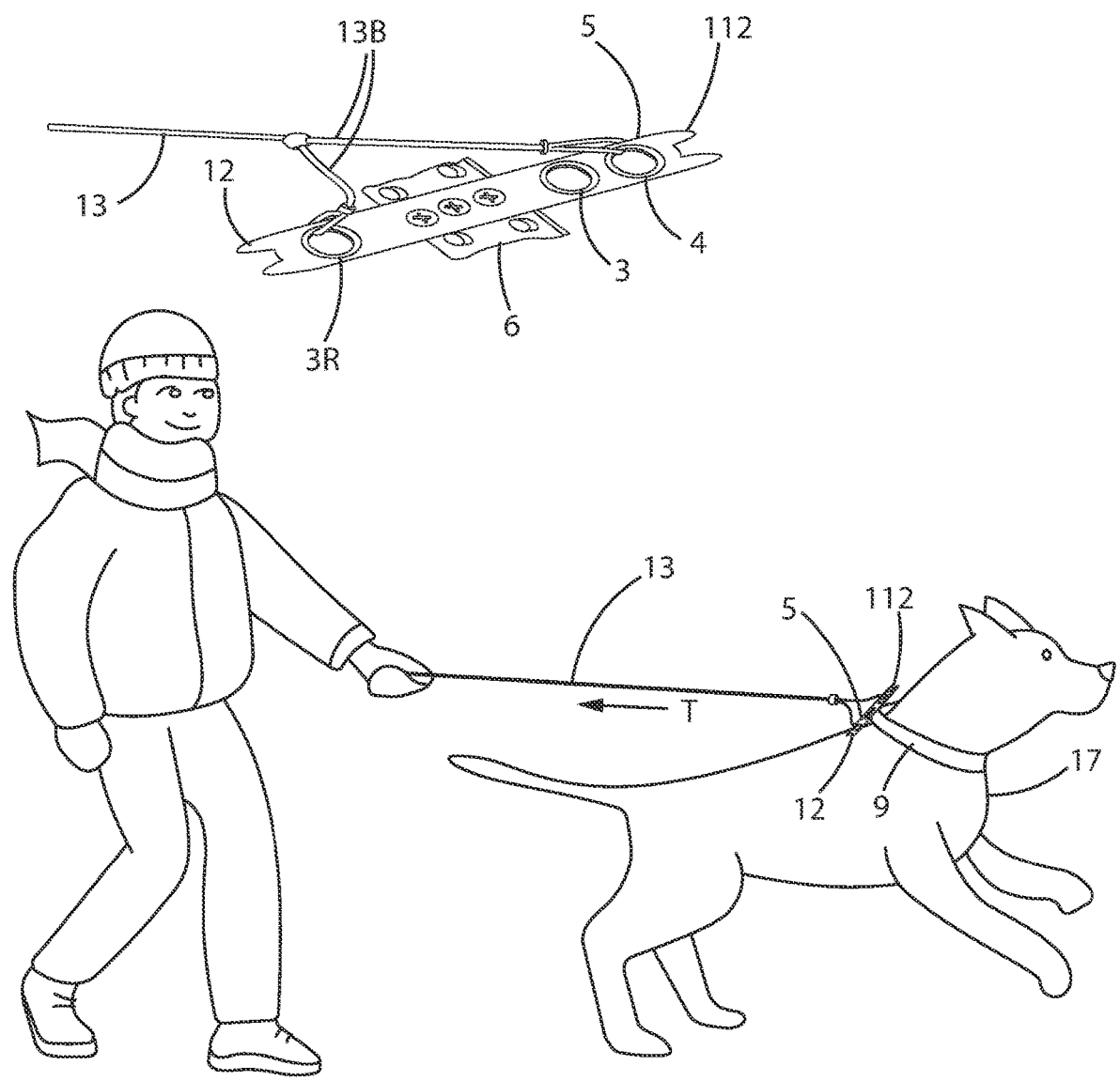

PET TRAINING APPARATUS

CROSS REFERENCE TO RELATED APPLICATIONS

This application claims benefit of U.S. Provisional Patent Application No. 63/290,159 filed Dec. 16, 2021, titled Pet Restraining Apparatus, the disclosure of which is incorporated herein by reference in its entirety.

BACKGROUND OF THE INVENTION

Field of the Invention

The invention relates to a pet restraining apparatus, particularly a contact lever attachment to dog collars or harnesses which, under leash tension, applies pressure from the tipping point of the lever to the body of a dog as leash tension increases and the pressure is recognizable to the dog as a more natural and gentle corrective behavior, as an example, taught from birth by the dam (female parent of a canine). The subsequent result is an immediate correction of restraint behavior, specifically related to constant pulling by the dog when leashed, wherein the dog ceases to pull towards a certain direction while being walked.

Description of the Related Art

U.S. Pat. No. 9,326,489 to Ritzdorf discloses a training device that provides for different corrective mechanisms to be applied under the collar about the circumference of the collar. In one embodiment, metal parts have a slot through which the collar passes. The plates are further connected to one another by a ring that serves a connection point for a leash. The opposite sides of the metal parts have jaws that pivot toward one another when the leash pulls on the ring to pinch the neck of the animal. In this construction, the jaws are intermediate the collar and the animal and when tension is applied and a gap is created, it is possible for the jaws to contact fur, hair, or only air as the jaws pivot towards one another. Thus, in order to avoid the jaws not grasping neck, the collar must be sufficiently tight which results in the jaws applying contact to the animal without need for correction (i.e. when the animal is not pulling at all).

U.S. Pat. No. 2,394,144 discloses a force collar in which pointed tips engage around the circumference of the neck when tension is applied to a leash connected to the collar. The points are applied axially inwards toward the neck about the circumference in areas where another animal would attack with teeth and thus would not result in a proper gentle correction of the animal.

SUMMARY OF THE INVENTION

It is accordingly an object of the invention to provide a corrective collar with a lever arm that overcomes a variety of disadvantages, including those mentioned above, of the heretofore-known devices and methods of this general type and which provides for a collar correction that is, more comfortable, gentle and which applies correction to the dog in the non-aggressive area of the neck used by a mother dog to control behavior of the dog. Also, as the movement is by rotation and directly by the pull of the animal, there is no need for springs generating spring forces or complex mechanical linkages to result in the correction.

The primary object of the present invention is to correctly address leash tension issues by reinforcing animal behavior that dogs recognize as corrective via a contact prong of the lever on the part of the body, that contacts the rear neck of the dog, instead of soliciting an aggressive/defensive behavioral response from the animal which results from dog collars that apply "choking" pressure to the neck or engagement with sensitive area of the neck to correct restraint issues.

A further object of the present invention is to provide a collar, harness, and collar attachment that are both safe for the animal and an effective means of correcting leash restraint issues. The body contact prong can be covered in a soft safety material such as foam, rubber or elastomer, which allows the dog to feel the necessary pressure on the body, such as dorsal side of its neck, recognize this as a signal to correct behavior, all while keeping the skin safe from abrasion.

Still another object of the present invention is to provide interchangeable contact prong attachments which change the pressure of the contact point on the body, such as rear neck of larger dogs and can be utilized by dog owners as needed.

Yet another object of the present invention is to provide both an attachment option to existing dog collars which secures to the collars or harnesses using the same mechanisms that collars and harnesses are secured by, for example side release buckles, or straps and buckles, as well as body contact lever arm as an integrated part of the collars or harnesses.

A further object of the present invention is to provide multiple leash attachment points on the body contact lever which allows for the adjustment of the degree of contact pressure felt by the dog under the same leash tension and can be increased by attaching the leash to the attachment point most cranial (closest to the head of the dog) and decreased by attaching to the attachment point most caudal (towards the tail of the dog).

Another object of the present invention is to provide a body contact lever arm with a length that is sufficient that the contact prong remains in place under leash tension, which increases a gap between the collar and the body and prevents the lever from being turned inwards into the space created when the collar is pulled backwards and away from the body.

With the foregoing and other objects in view there is provided a correction device includes a collar segment for extending in a circumferential direction around an animal's neck. A lever arm affixed to the collar segment. The lever arm has an extent transverse to the circumferential direction. The lever arm has a first end extending beyond a circumferential edge of the collar segment and is rotationally displaceable about the circumferential direction to contact a rear of the neck of the animal when the animal pulls on a leash connected to the lever arm. The lever arm has a connection position opposite the first end for attachment of the leash.

It is accordingly a further feature of the invention, the connection position is disposed beyond a second circumferential edge of the collar segment opposite the circumferential edge.

In accordance with an added feature of the invention, the connection position is multiple connection positions spaced along the extent.

In accordance with an additional feature of the invention the connection positions are apertures formed in the lever arm.

In accordance with yet an additional feature of the invention, the collar segment is provided with a female buckle mechanism at a first end thereof and a male buckle mechanism at a second end for connection into a collar with mating male/female buckle mechanism.

In accordance with yet another added feature of the invention, the collar segment has holes formed therein at a first end thereof and a prong-type buckle mechanism at a second end for connection into a collar having a prong-type buckle mechanism.

In accordance with still another added feature of the invention, the lever arm is attached to the collar segment by a rivet.

In accordance with still another added feature of the invention, the first end is defined as a contact prong.

In accordance with still a further feature of the invention, there is provided a soft protective cover disposed on the contact prong for making the contact gentler on the neck.

In accordance with yet still a further feature of the invention, the contact prong is multiple prongs spaced side by side.

In accordance with still another feature of the invention, there is provided an attachment disposed on the lever arm, the attachment has attachment prongs at a greater spacing apart than the prongs.

In accordance with still another added feature of the invention, there is a forward contact prong at a second end of the lever arm opposite the first end.

In accordance with another added feature of the invention, the lever arm is a substantially flat plate with a plate face resting against a face of the collar segment that extends between the first and second circumferential edges.

In accordance with another added feature of the invention, the lever arm has a rearward connection point opposite said connection point.

In accordance with still another added feature of the invention, there is a bridle connected to said rearward connection point and said connection point.

Can be implemented as solid unit or flexible.

Additional frontal contact prong, if needed.

Other features which are considered as characteristic for the invention are set forth in the appended claims.

Although the invention is illustrated and described herein as embodied in as a contact lever arm for a dog collar, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 9 is a depiction of a second embodiment with the rear neck contact lever arm under leash tension;

FIG. 10 is a depiction of the rear neck contact lever arm of FIG. 9 under leash tension;

DETAILED DESCRIPTION OF THE INVENTION

Figure 1:
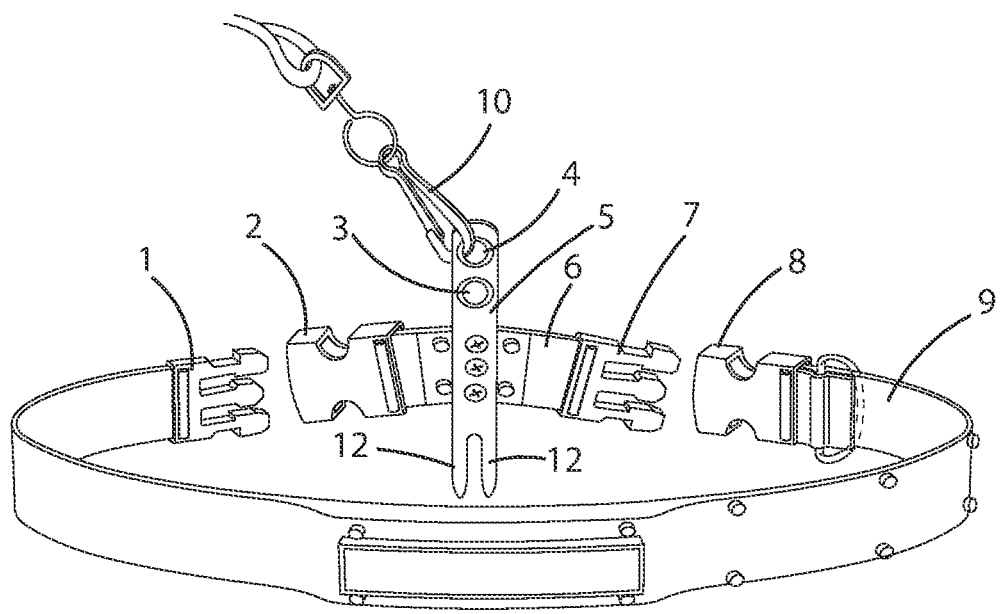
FIG. 1 is a frontal perspective view of a body contact lever attachment and collar according to an embodiment of the present invention.

Referring now to the figures of the drawings in detail and first, particularly to FIG. 1 thereof, there is shown a frontal view of the body contact lever arm 5 constructed to attach to existing dog collars 9 via male 1, 7 and female 2, 8 side-release buckle system as known in the art. The body contact lever arm 5 has at least one rear neck contact prong or projection 12 for contacting the dog 17 at a point behind a circumferential edge of the collar segment 6 (toward the tail of the dog 17) on the nape of the neck of the dog 17, the prong 12 tapers to a blunt tip. The lever arm 5 has leash connection positions 3, 4 opposite the contact prong 12 on an opposite side (opposite circumferential edge) of the collar segment 6, toward the head of the dog 17. The attachment of the lever arm 5 to the collar segment 6 can be made by rivet(s) or other suitable mechanical fasteners. The connection positions 3, 4 can be provided as apertures formed in the lever arm 5 and are engaged by a leash clasp 10 to connect the leash 13 to the lever arm 5 and thus the collar 9. The lever arm 5 is rigidly attached to collar segment 6 in FIG. 1 and is disposed with a planar face substantially parallel to the circumferential surfaces of the collar. In FIG. 1, the collar segment 6 is defined by male/female side-release buckle system 2, 7 for connection to a collar 9 with the corresponding male/female side-release buckle system 1, 8. The contact lever arm 5 has a longitudinal extent that extends transverse to the encircling direction (circumferential direction) of the collar 9 and thus also transverse to the collar segment 6 around the neck of the dog 17. This results in the contact prong 12 extending from the collar 9 in a direction towards the tail of the dog 17 when in place on the dog 17. It is preferable that the transverse relationship between the longitudinal extent of the arm 5 is substantially perpendicular to the encircling direction of the collar 9. This construction results in the lever arm being neutral when no tension is on the leash 13 (no correction) and in the end of the contact prong 12 engaging the neck in the non-aggressive neck position (nape) when tension is on the leash 13 due to the dog 17 pulling on the leash 13.

Figure 1A:
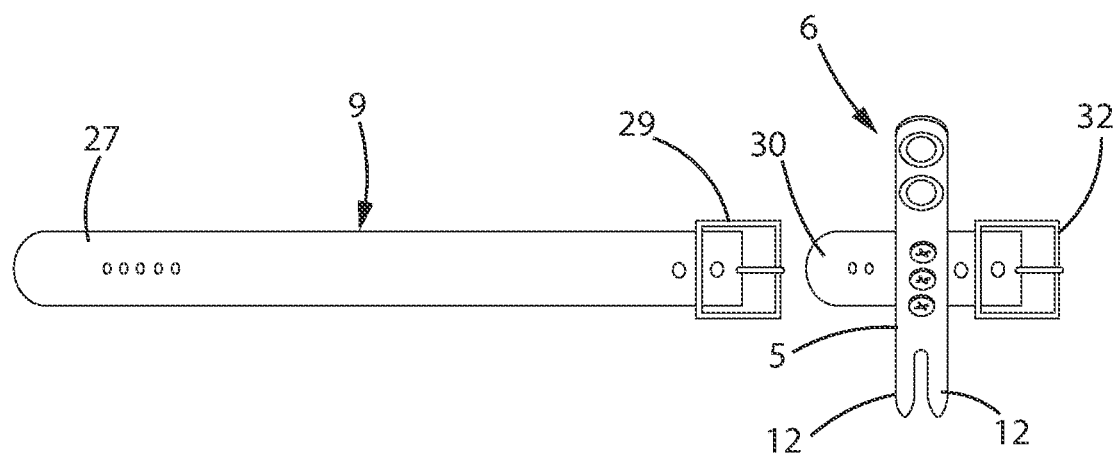
FIG. 1A is a plan view of the body contact lever attachment and buckle type collar.

FIG. 1A shows a frontal view of the body contact lever arm 5 rigidly fixed to collar segment 6 that has a strap 30 and buckle 32 to attach to and close existing buckle type dog collars 9 having strap 27 and buckle connection 29. The fastening of the lever arm 5 to the collar segment 6 and the relationships of the arm 5 are the same as in FIG. 1.

The different attachment mechanisms provide for attachment to existing collars that the dog owner would already have and makes the implementation straight forward and affordable for existing collars. Furthermore, the leash connection ring of the collar 9 remains available as an option for connection of the leash 13, so that the dog owner/trainer can choose when to implement the lever arm 12 for training purposes. For example, to allow use in an area where or situation in which the owner would expect a pulling reaction from the dog 17.

Figure 2:
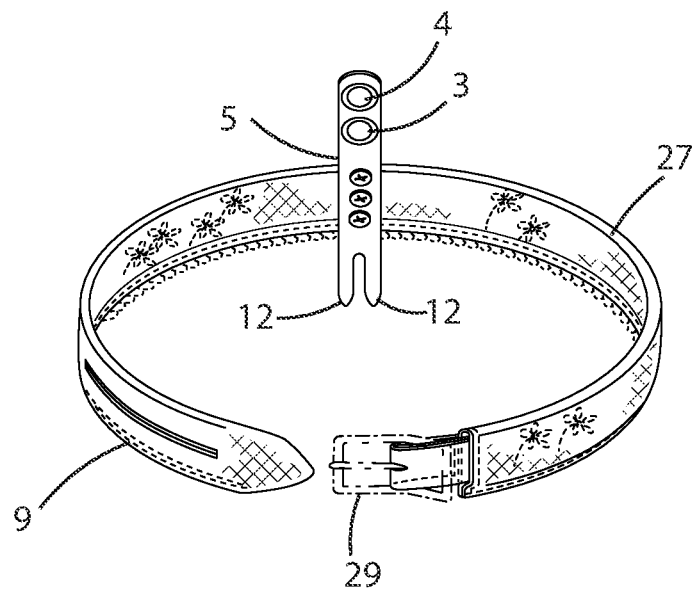
FIG. 2 is a frontal perspective view of a dog collar with a lever arm.

FIG. 2 shows a frontal view of the dog collar 9 on which the lever arm 12 is provided on a collar segment 6 of a collar 9 where the collar 9 has strap 27 and prong buckle 29 with a frame, bar and prong as known in the art. The relationship of the lever arm 5 to the collar 9 is the same as in FIGS. 1 and 1A.

Figure 3:
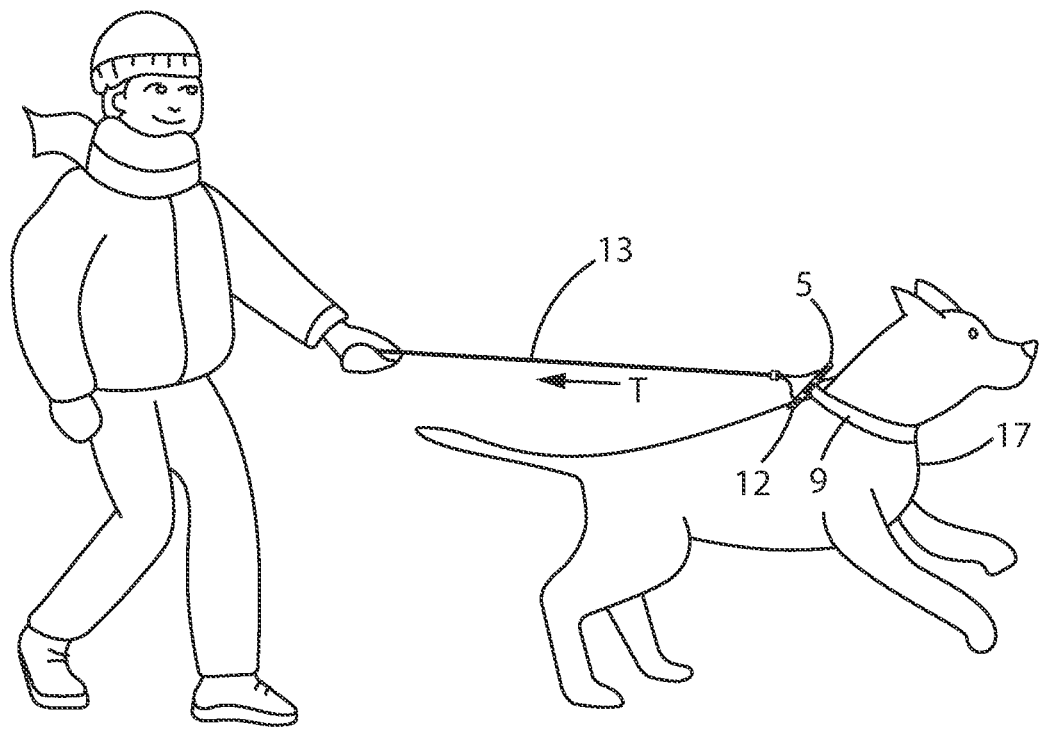
FIG. 3 is a depiction of the rear neck contact lever arm under leash tension.

FIG. 3 shows a depiction of the rear neck contact lever arm 5 under leash tension T from the leash 13, with the rear neck contact prong 12 of the contact lever arm 5 exerting pressure downwards on the neck of the dog 17 as the leash tension T increases resulting in a twisting of the collar 9 at the segment 6. The tension T results in a rotation of the lever arm 5 about the circumference of the collar 9, which results in the prong 12 being displaced towards the neck of the dog 17. Once the dog 17 quits pulling the lever arm 5 reverts to a neutral position and the prong 12 rotates away from the neck so that the contact and thus the correction is ended.

Figure 4:
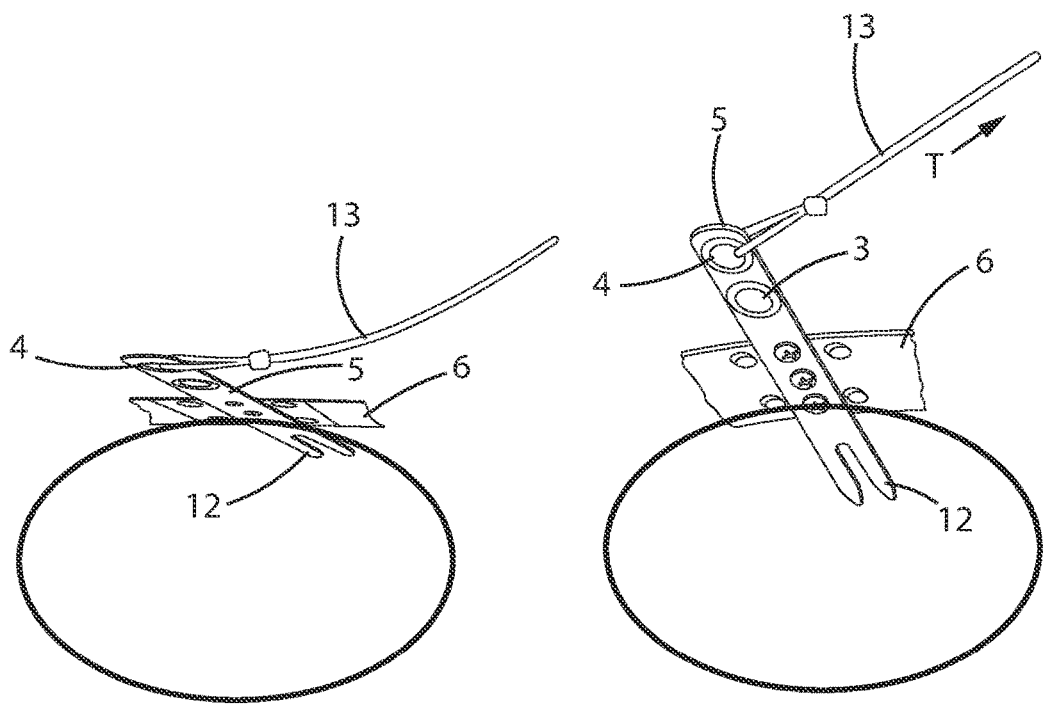
FIG. 4 are frontal views of the neck contact lever collar attachment attached to a dog collar from a perspective facing the dog.

FIG. 4 shows frontal views of the contact lever arm 5 attached to a dog collar 9 from the perspective facing the dog 17. Without any leash tension T, in the left-side view (neutral position), the contact lever arm 5 remains flat at the rear neck of the dog 17 and thus the contact prong 12 does not apply any pressure to the rear of the neck. However, in the right-side view, as leash tension T is generated by the dog 17 pulling, the contact lever arm 5 is rotated by the tension T and the connection of the leash 13 to one of the connection positions 3, 4 so that the lever arm 5 rotates towards the neck and the contact prong 12 is directed downwards onto the rear neck of the dog 17. This construction avoids additional mechanical mechanisms and kinematic elements normally required by corrective collars known in the art.

Figure 5:
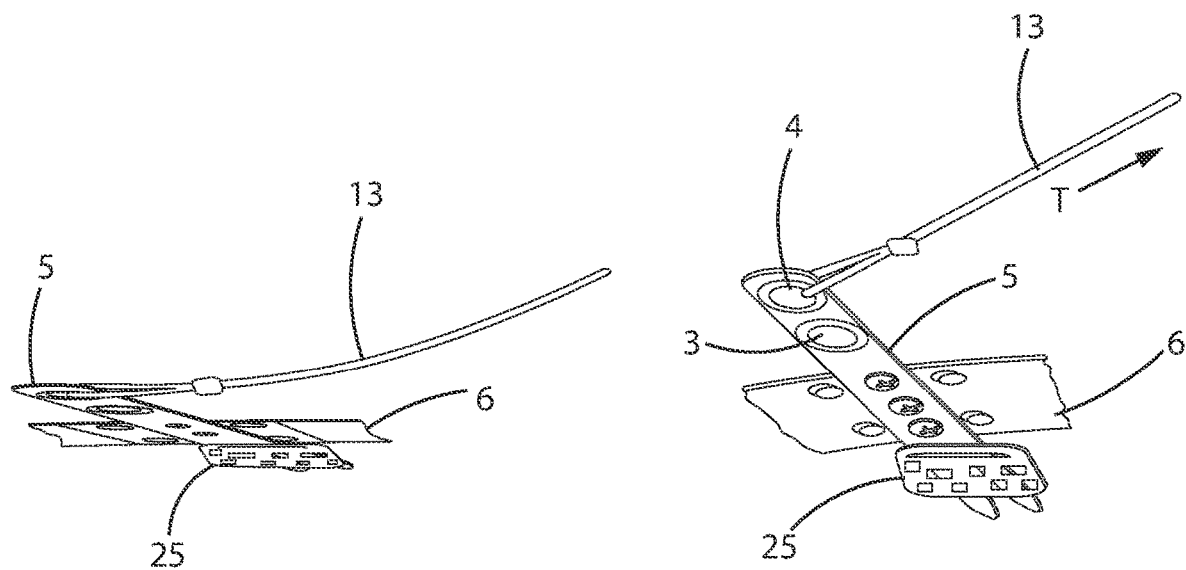
FIG. 5 are frontal views as shown in FIG. 4 with safety protective covers.

FIG. 5 shows the two above-noted frontal views in FIG. 4 with a soft protective cover 25 in position on the contact prong 12. The cover 25 is of foam, rubber, or elastomer and defines a protective barrier between the contact prong 12 of the lever arm 5 and the neck of the dog 17 to make the correction even more gentle on the dog 17.

Figure 6:
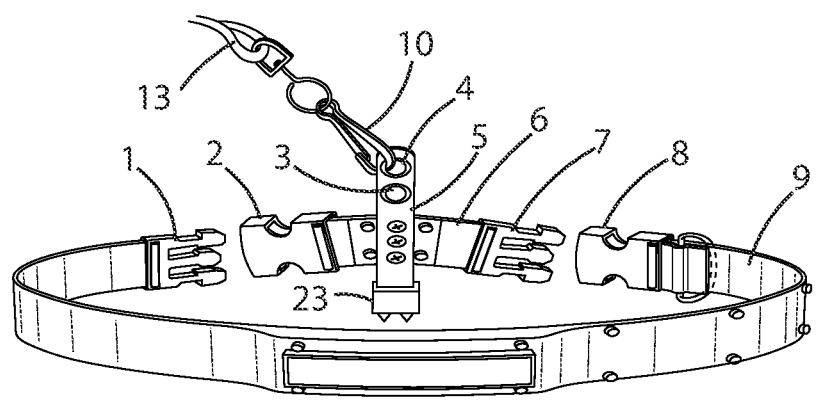
FIG. 6 is a frontal perspective view of a body contact lever attachment and collar with the safety foam protective barrier.

FIG. 6 shows a frontal view of the lever arm 5 equipped with the soft safety foam protective barrier 25 attached to the contact prong 12 of the lever arm 5.

Figure 7:
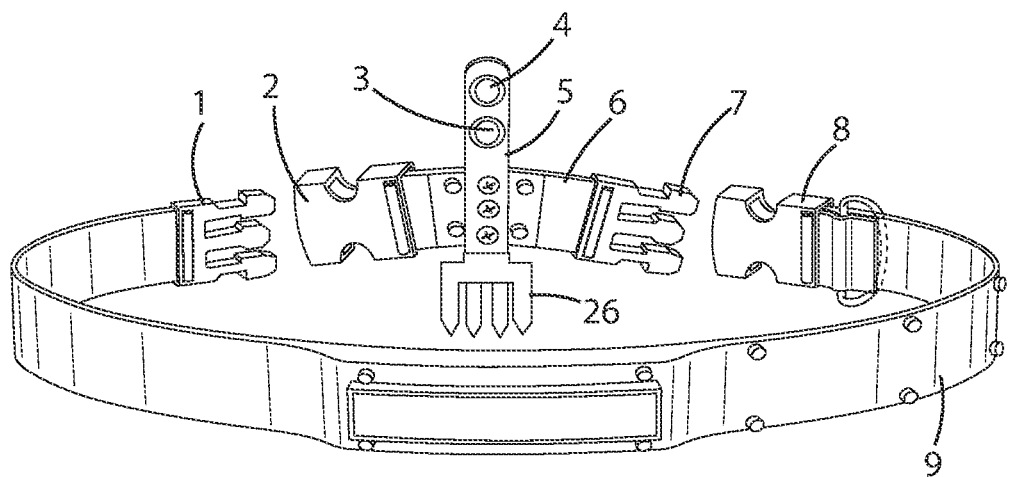
FIG. 7 is a frontal perspective view of a body contact lever attachment and collar with an interchangeable contact prong attachment.

FIG. 7 shows a frontal view of the body contact lever attachment equipped with an interchangeable contact prong attachment 26, which increases the width of the body contact prong 12 for the rear neck of larger dogs and can be utilized by dog owners as needed.

Figure 8:
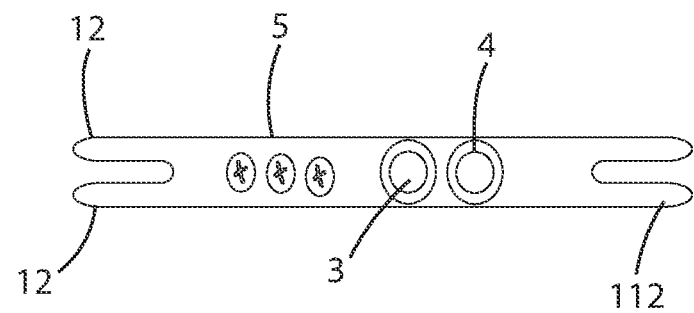
FIG. 8 is an illustration showing an additional frontal tipping prong.

FIG. 8 shows an additional front neck contact prongs 112 opposite the rear neck contact prong 12, which can be also be provided on the lever arm 5.

Figures 11, 12:
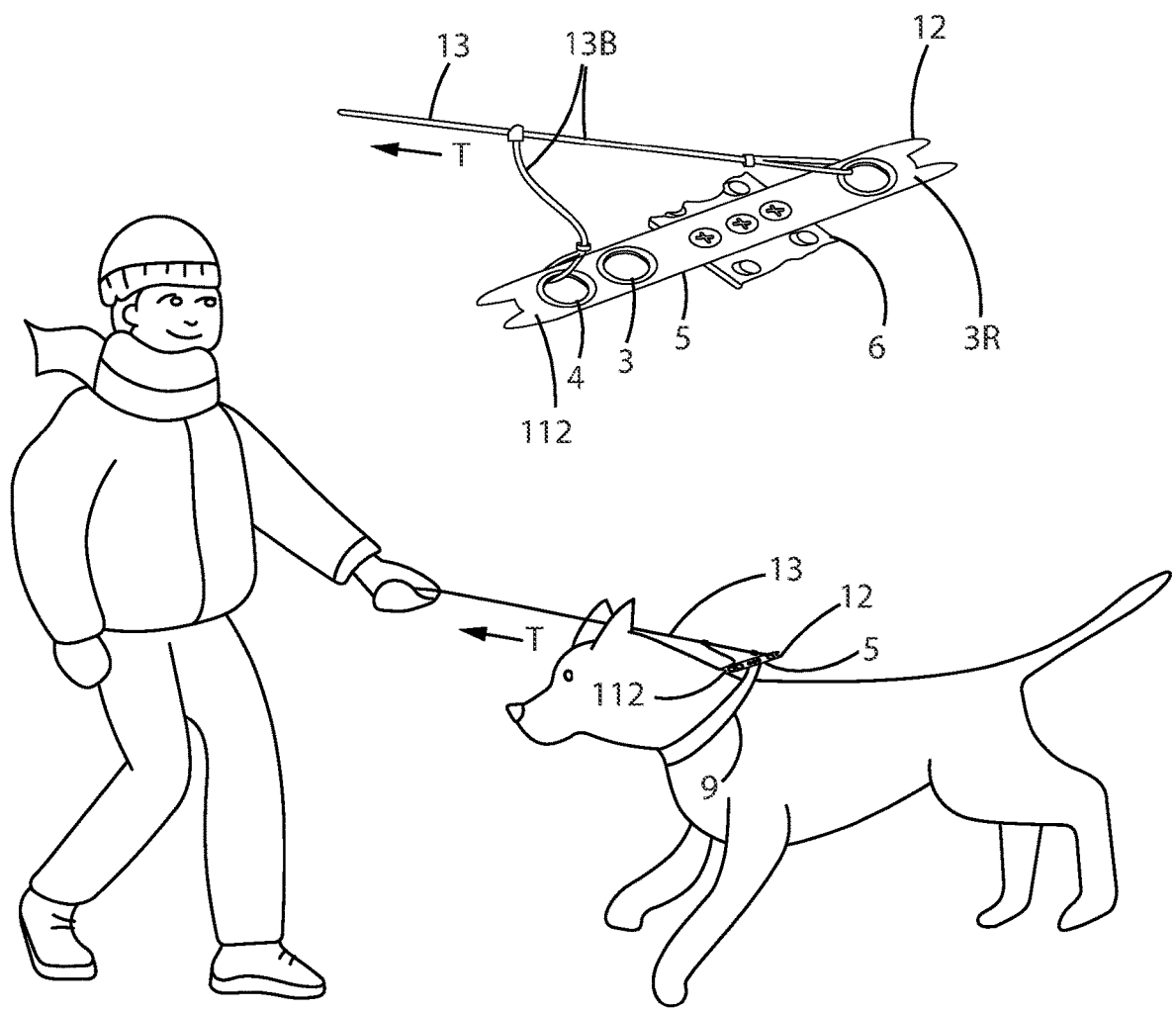
FIG. 11 is a depiction of the second embodiment with the rear neck contact lever arm under leash tension as a dog backs away.
FIG. 12 is a depiction of the rear neck contact lever arm of FIG. 9 under leash tension as applied in FIG. 11.

FIG. 9 shows a rearward connection point 3R that is on the end of the contact lever arm 5 near the rear neck contact prong 12, where the contact lever arm 5 has the front neck contact prongs 112 opposite the rear neck contact prong 12 as in FIG. 8. As shown in FIGS. 9-12, the leash 13 is connected to one of the connection points 3, 4 and the rearward connection point 3R. The connection to one of the connection points 3, 4 and the rearward connection point 3R can be made by a leash connection bridle 13B that is attached the leash 13. The bridle 13B has a run to the to one of the connection points 3, 4 and a second run to the rearward connection point 3R. Without any leash tension T, the contact lever arm 5 remains flat at the rear neck of the dog 17 and thus the contact prongs 12 and 112 do not apply any pressure to the rear of the neck. However, as shown in FIGS. 9 and 10, as leash tension T is generated by the dog 17 pulling with the face away (in a forward walking manner), the contact lever arm 5 is rotated by the tension T and the connection of the leash 13 to one of the connection positions 3, 4 so that the lever arm 5 rotates towards the neck and the contact prong 12 is directed downwards onto the rear neck of the dog 17. In this situation the leash connection becomes slack to the rearward connection point 3R. As shown in FIGS. 11 and 12, as leash tension T is generated by the dog 17 pulling in a backing away direction (dog facing the user), the contact lever arm 5 is rotated by the tension T and the connection of the leash 13 to one of the connection position 3R so that the lever arm 5 rotates towards the neck and the front neck contact prong 112 is directed downwards onto the rear neck of the dog 17. In this situation the leash connection becomes slack to the connection point 3 or 4.

This construction avoids additional mechanical mechanisms and kinematic elements normally required by corrective collars known in the art.

The invention claimed is:

1. A correction device, comprising:
a collar segment for extending in a circumferential direction around an animal's neck, said collar segment having lateral sides; and
a lever arm affixed to said collar segment at a circumferentially fixed position and having an extent transverse to the circumferential direction and extending beyond said lateral sides, said lever arm having a first end extending beyond a circumferential edge of said collar segment and rotationally displaceable about the circumferential direction for contacting a rear of the neck of the animal when the animal pulls on a leash connected to said lever arm, said lever arm having a connection position opposite said first end for attachment of the leash.

2. The correction device according to claim 1, wherein said connection position is disposed beyond a second circumferential edge of said collar segment opposite said circumferential edge.

3. The correction device according to claim 2, wherein said connection position is multiple connection positions spaced along said extent.

4. The correction device according to claim 3, wherein said connection positions are apertures formed in said lever arm.

5. The correction device according to claim 2, wherein said lever arm is a substantially flat plate with a plate face resting against a face of said collar segment that extends between said first and second circumferential edges.

6. The correction device according to claim 1, wherein said collar segment is provided with a female buckle mechanism at a first end thereof and a male buckle mechanism at a second end for connection into a collar with mating male/female buckle mechanism.

7. The correction device according to claim 1, wherein said collar segment has holes formed therein at a first end thereof and a prong buckle mechanism at a second end for connection into a collar having a prong buckle mechanism.

8. The correction device according to claim 1, wherein said lever arm is attached to said collar segment by a rivet.

9. The correction device according to claim 1, wherein said first end is defined as a contact prong.

10. The correction device according to claim 9, further comprising a soft protective cover disposed on said contact prong for making the contact gentler on the neck.

11. The correction device according to claim 9, wherein said contact prong is multiple prongs spaced side by side.

12. The correction device according to claim 11, further comprising an attachment disposed on said lever arm, said attachment having attachment prongs at a greater spacing apart than said prongs.

13. The correction device according to claim 1, further comprising a forward contact prong at a second end of said lever arm opposite said first end.

14. The correction device according to claim 13, wherein said lever arm has a rearward connection position opposite said connection position.

15. A correction device, comprising:
a collar segment for extending in a circumferential direction around an animal's neck;
a lever arm affixed to said collar segment and having an extent transverse to the circumferential direction, said lever arm having a first end extending beyond a circumferential edge of said collar segment and rotationally displaceable about the circumferential direction for contacting a rear of the neck of the animal when the animal pulls on a leash connected to said lever arm, said lever arm having a connection position opposite said first end for attachment of the leash, said lever arm has a rearward connection position opposite said connection position;
a forward contact prong at a second end of said lever arm opposite said first end; and
a bridle connected to said rearward connection position and said connection position.

16. A correction device, comprising:
a collar segment for extending in a circumferential direction around a neck of an animal, said collar segment having a lever arm disposed thereon, said lever arm extending transverse to the circumferential direction, said lever arm having a first end defined by a first end contact prong for contacting a rear of the neck towards a head of the animal when the animal pulls on a leash connected to said lever arm, said lever arm having a second end opposite said first end, said second end defined by second end contact prongs for contacting the rear of the neck toward the a tail of the animal when the animal pulls on the leash connected to said lever arm.

* * * * *